(12) United States Patent
Sun

(10) Patent No.: US 8,542,944 B2
(45) Date of Patent: Sep. 24, 2013

(54) METHOD AND APPARATUS FOR MULTI-SCALE BASED DYNAMIC RANGE COMPRESSION AND NOISE SUPPRESSION

(75) Inventor: Wenwu Sun, Shenzhen (CN)

(73) Assignee: Shenzhen Mindray Bio-Medical Electronics Co., Ltd., Shenzhen (CN)

(*) Notice: Subject to any disclaimer, the term of this patent is extended or adjusted under 35 U.S.C. 154(b) by 997 days.

(21) Appl. No.: 12/579,219

(22) Filed: Oct. 14, 2009

(65) Prior Publication Data

US 2010/0092102 A1    Apr. 15, 2010

(30) Foreign Application Priority Data

Oct. 14, 2008    (CN) .......................... 2008 1 0216838

(51) Int. Cl.
*G06K 9/40*    (2006.01)

(52) U.S. Cl.
USPC ........... 382/275; 382/128; 382/254; 382/260; 382/261; 382/274

(58) Field of Classification Search
USPC .................. 382/128, 240, 247, 254, 260, 261, 382/274–276, 298, 299, 302; 375/240.19
See application file for complete search history.

(56) References Cited

U.S. PATENT DOCUMENTS

| | | | | |
|---|---|---|---|---|
| 5,644,662 A * | 7/1997 | Vuylsteke | ...................... | 382/302 |
| 5,805,721 A * | 9/1998 | Vuylsteke et al. | ............ | 382/128 |
| 5,907,642 A * | 5/1999 | Ito | ................................. | 382/302 |
| 6,731,790 B1 * | 5/2004 | Van de Velde et al. | ....... | 382/162 |
| 6,937,772 B2 * | 8/2005 | Gindele | ........................ | 382/240 |
| 7,146,059 B1 | 12/2006 | Durand et al. | | |
| 2005/0281458 A1 * | 12/2005 | Adams et al. | ................. | 382/162 |
| 2006/0210186 A1 * | 9/2006 | Berkner | ....................... | 382/248 |

FOREIGN PATENT DOCUMENTS

| CN | 1843296 A | 10/2006 |
|---|---|---|
| CN | 101159062 A | 4/2008 |

OTHER PUBLICATIONS

C. Tomasi and R. Manduchi, "Bilateral Filtering for Gray and Color Images" IEEE, Sixth International Conference on Computer Vision, Jan. 1998, pp. 839-846.*

Yong, Sun, "Image-Strengthen Technique of PACS Workstation," Diss. Shandong University of Science and Technology, College of Information Science and Engineering, 2005.

* cited by examiner

*Primary Examiner* — Eric Rush
(74) *Attorney, Agent, or Firm* — Kory D. Christensen; Stoel Rives LLP

(57) ABSTRACT

An input image is decomposed into a residual image and a set of detail images in different levels of a hierarchy. The set of detail images are enhanced after which noise reduction filtering is directly applied to the enhanced set of detail images without the need to apply noise estimation to a local area of the enhanced set of detail image in advance. The residual image and the set of detail images with reduced noise are recomposed so as to obtain resultant image.

17 Claims, 6 Drawing Sheets

METHOD AND APPARATUS FOR MULTI-SCALE BASED DYNAMIC RANGE COMPRESSION AND NOISE SUPPRESSION

CROSS-REFERENCE TO RELATED APPLICATIONS

This application claims priority to Chinese Patent Application No. 200810216838.9, filed Oct. 14, 2008, which is incorporated herein by reference in its entirety.

TECHNICAL FIELD

This disclosure relates to image processing.

DETAILED DESCRIPTION

Figure 1:
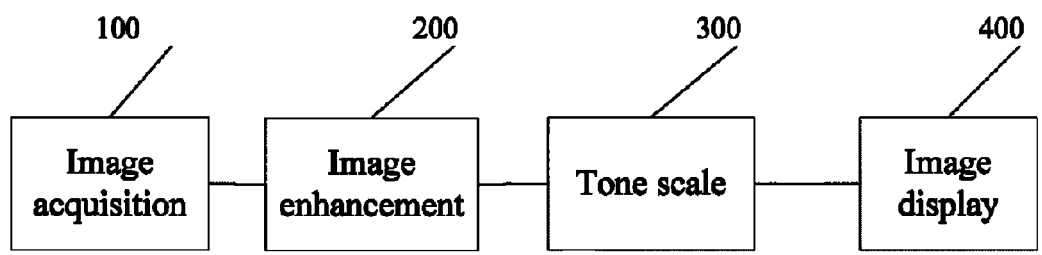
FIG. 1 is a schematic diagram of an image processing system.

A digital radiography (DR) input image has a broad dynamic range, and the contrast of some details of a DR input image is also not high. In order to clearly identify details of a DR input image, image enhancement is generally required to be performed on the image. However, the noise in the image is increased through image enhancement, causing the image to be coarse-grained, thereby failing to satisfy the requirements for clinical diagnosis. Therefore, simultaneously with the image enhancement, noise suppression is typically performed.

Furthermore, in order to simultaneously observe a plurality of tissues with significantly different data values in the image without substantially reducing details of the image, compression and equalization processing are performed on the broad dynamic range of the images during an image processing process.

Currently, there are a number of methods for performing image processing on DR images. According to a one technique for multi-scale noise reduction including dynamic range compression, an image that needs to be enhanced is decomposed into detail images of different sizes in the form of pyramids. As the sizes of details contained in the detail images become increasingly larger, the size of the image becomes increasingly smaller, thereby reducing the amount of calculation during the subsequent filtering and interpolating processes.

When each of the detail images is enhanced, the noise thereof may be amplified. In order to suppress noise, the method performs noise estimation based upon the variance of data within a local area of the image. Since the noise changes with the signal intensities in the different local areas of the image, the noise reduction process of the method is self-adaptive. Furthermore, the dynamic range compression in the method is performed in parallel with the detail enhancement and noise suppression. To perform the self-adaptive noise suppression, the degree of the noise is required to be estimated in advance by virtue of the local area information, and the method thus becomes very complicated.

According to another technique for multi-scale image enhancement including the dynamic range compression, the image is decomposed into a high frequency band image corresponding to the detail information and a low frequency band image including only the trend of data variation of the image (corresponding to the trend of the lightness variation of the image). Thereafter, the pixel value of the low frequency band image is multiplied by a coefficient, and the pixels value of the resultant image are translated, so that the mean values of the images before and after compressing are identical. In this method, each translated pixel value is further added with a correction value that linearly or nonlinearly varies with the magnitude of this pixel value. The smaller the pixel value is, the larger the corresponding correction value will be. The correction value curve in which the pixel values are the variables are odd symmetrical with respect to the point with the image mean value. However, according to this method, in order to solve the problem of noise suppression, steps such as noise estimation, judgment of the importance of anatomical regions, and detection of tissue edges are also required to be performed in advance, thereby increasing the amount of calculation.

To overcome these issues, the present disclosure provides an apparatus and method for multi-scale based dynamic range compression and noise suppression. According to one embodiment, an apparatus for processing an input image includes an image decomposition unit for decomposing the input image into a residual image and a set of detail images in different levels of a hierarchy; an image enhancement unit for enhancing the set of detail images; a noise suppression unit for reducing noise of the enhanced set of detail images without performing noise estimation in advance on a local area of the enhanced set of detail images; and an image reconstruction unit for recomposing the residual image and the noise-reduced set of detail images to obtain a resultant image.

A method for processing an input image may include an image decomposition step for decomposing the input image into a residual image and a set of detail images in different levels of a hierarchy; an image enhancement step for enhancing the set of detail images; a noise suppression step for reducing the noise of the enhanced set of detail images without performing noise estimation in advance on a local area of the enhanced set of detail images; and an image reconstruction step for recomposing the residual image and the set of detail images with reduced noise to obtain a resultant image.

In this way, the steps of noise degree estimation, noise estimation, judgment of the importance of anatomical regions, and detection of tissue edges are not required to be performed in advance. Thus, the process of image processing is simplified and the efficiency of image processing is improved.

In one embodiment, the noise suppression process suppresses noise with a noise filter, which can retain the detail edge information for the enhanced set of detail images, while reducing the noise of the enhanced set of detail images. Therefore, while the image noise suppression is simplified, the detail information of the image is retained sufficiently.

In one embodiment, with the noise filter, a pixel that is closer to a current pixel has greater influence on filtering of the current pixel, and a pixel that has a value differing farther from that of the current pixel has less influence on filtering of the current pixel.

In one embodiment, the noise filter uses the following equation to reduce the noise of the enhanced set of detail images:

$$L'[p,q] = \frac{\sum\limits_{j\neq 0, k\neq 0} L'[p+j, q+k] \cdot \exp\left(-\frac{r^2}{3\sigma^2} - \frac{(L'[p+j, q+k] - L'[p,q])^2}{t^2}\right)}{\sum\limits_{j\neq 0, k\neq 0} \exp\left(-\frac{r^2}{3\sigma^2} - \frac{(L'[p+j, q+k] - L'[p,q])^2}{t^2}\right)}$$

where, L' and L' are respectively images before and after filtering; r is the distance between pixel (p, q) and pixel (p+j, q+k) in the image L', p and q being integers greater than or equal to 0, j and k being integers not equal to 0, and the values of j and k depending on the size of the filter; for a filter with a size of (2x+1)×(2y+1), |j|≦x and |k|≦y, and x and y are positive integers; σ is a constant for controlling the degree of spatial smoothness, the value of which is a real number greater than 0; and t is a constant representing the gray scale threshold, the value of which is a positive integer no greater than the maximum gray scale value.

In one embodiment, the dynamic range compression is performed on the enhanced set of detail images and the residual image such that the contrast of the region of interest in the input image would not be reduced while the resultant image is displayed. Thus, the quality of the resultant image is further improved.

In one embodiment, the residual image is compressed by performing a weighted average on the residual image and a uniform image, thereby reducing the variation range of data in the residual image without changing the contrast of the details in the region of interest in the input image.

In one embodiment, the weighted average is performed on the residual image and a uniform image according to the following equation:

$$I''_{n-1}[p,q] = I'_{n-1}[p,q] * \alpha + B[p,q] * (1-\alpha)$$

where $I'_{n-1}[p,q]$ and $I''_{n-1}[p,q]$ are respectively the residual images before and after compressing, p and q being integers greater than or equal to 0; α is a weighting coefficient, the value of which may be a real number between 0 and 1; B[p,q] is a uniform image, wherein the value of each pixel is a constant, e.g., a mean value of pixels in a region of interest of the input image, wherein the region of interest may be obtained by performing image segmentation on the input image; and n is a positive integer representing the number of levels of the hierarchy of the input image decomposed by the image decomposition step.

In one embodiment, a higher compression ratio is applied to the compression of the contrast for the detail image with higher contrast. Thus, the observation of the image details is less affected.

In one embodiment, the compression is applied to the detail images according to the following equation:

$$O_i[p,q] = L'''_i[p,q] * \beta_i$$

where, $L'''_i[p,q]$ is a detail image before compressing; $O_i[p,q]$ is a detail image after compression; p and q being integers greater than or equal to 0; and the value of $\beta_i$ is specified as follows:

$$\beta_i = \begin{cases} 1, & i \leq \tau \\ 1 - \frac{1-\alpha}{n-1-\tau}(i-\tau), & i > \tau \end{cases}$$

n is a positive integer representing the total number of levels of the hierarchy of the input image decomposed by the image decomposition unit; i refers to the level number of the hierarchy in which a compressed detail image is located; τ is a constant, the value of which is an integer between 0 and n; and α is a weighting coefficient, the value of which may be a real number between 0 and 1.

Reference is now made to the figures in which like reference numbers refer to like elements or steps throughout the disclosure. In the following detailed description, numerous specific details are set forth in order to provide a thorough understanding of the disclosure. However, it is understood by those skilled in the art that the embodiments of the disclosure may also be practiced without these specific details. Well-known methods, processes, components and units have not been described in details in order not to obscure more relevant details of the disclosure.

FIG. 1 shows a schematic diagram of an image processing system. In one embodiment, the image processing system includes an image acquisition unit 100, an image enhancement unit 200, a tone scale unit 300, and an image display unit 400. The image acquisition unit 100 is used to acquire input image data. The image enhancement unit 200 is used to enhance the details of the input image in order to clearly distinguish the details of the input image, and the local effect of the image processed by the image enhancement unit is improved. The tone scale unit 300 is used to perform the optimal conversion transformation on an enhanced image in order to improve the global effect of the image optimized. The image display unit 400 is used to display a resultant image.

Figure 2:
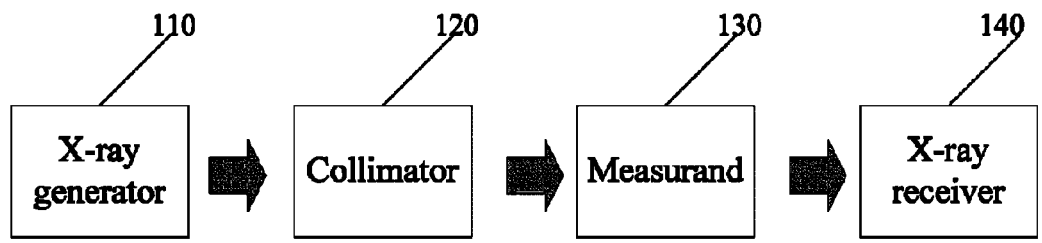
FIG. 2 is a schematic diagram of an image acquisition unit.

FIG. 2 is a schematic diagram of an image acquisition unit according. As illustrated, the image processing unit 100 may include an X-ray generator 110, a collimator 120, and an X-ray receiver 140. The X-ray radiation emitted by the X-ray generator 110 passes through a measurand 130 via the collimator 120, and a ray that has passed through the measurand 130 is received by the X-ray receiver and converted into data of the input image. The X-ray receiver may be a flat panel detector, a CCD, an IP panel, a film camera, or the like in a CR.

Figure 3:
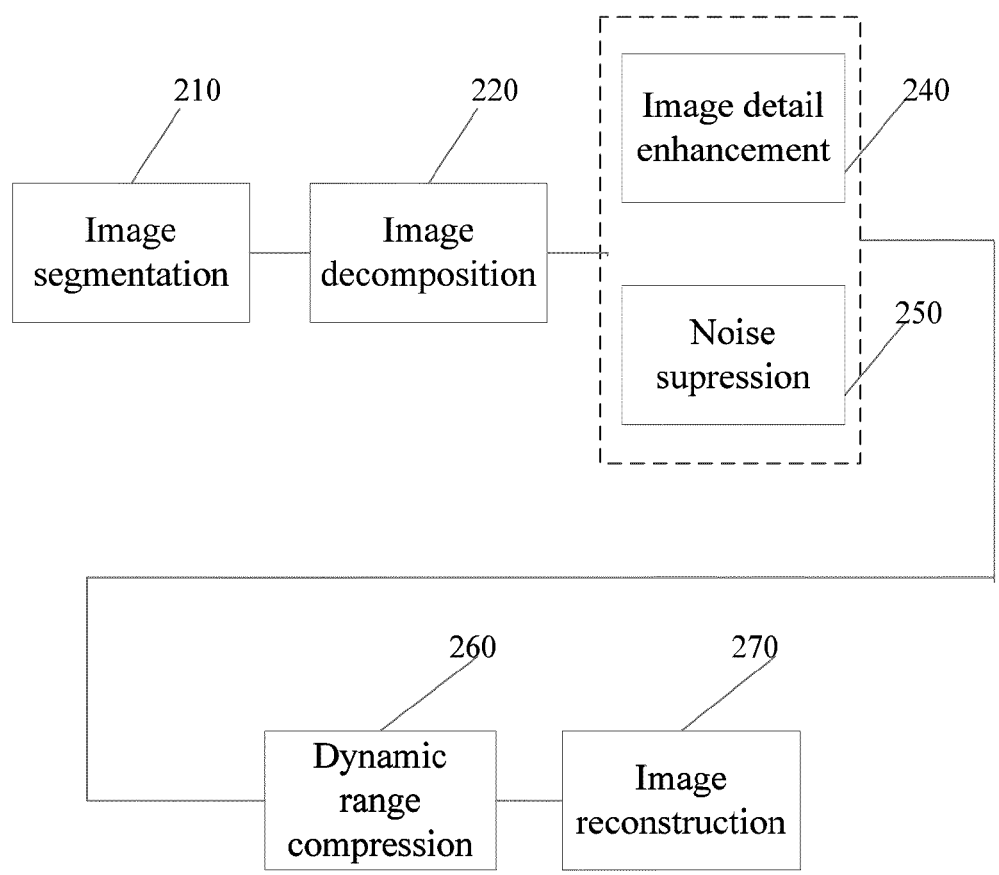
FIG. 3 is a schematic diagram of an image enhancement unit.

FIG. 3 is a schematic diagram of an image enhancement unit 200. The image enhancement unit 200 may include an image segmentation unit 210, an image decomposition unit 220, an image detail enhancement unit 240, a noise suppression unit 250, a dynamic range compression unit 260 and an image reconstruction unit 270.

The image segmentation unit 210 is used to segment different areas with particular characters in the input image. The areas do not intersect one another, and each area satisfies the consistency of a particular area. In an embodiment of the disclosure, these different areas may be measurand areas and background areas, wherein the measurand may be a human body or a specific part of a human body; or these different areas may be regions of interest and regions of no interest. For example, the image segmentation unit 210 may apply background area segmentation and collimator area segmentation to the input image acquired by the image acquisition unit 100. In various embodiments, the input image acquired may be a digital image, but not limited to a digital image.

With respect to the input image acquired by the image acquisition unit 200 shown in FIG. 2, the background area refers to the area where the ray directly irradiates, and the collimator area refers to the area determined by the collimator. As the pixel value within a non-background area is often much greater than that within a background area, for a uniform background area, the threshold of the background area segmentation may be simply found in the histogram of the input image, and the input image acquired by the image acquisition unit 100 is segmented by means of a thresholding method.

For a non-uniform background area segmentation, due to anisotropy in intensity of irradiation, the pixel value of within the background area may vary even more greatly, and a complicated segmentation strategy is thus required. The complicated segmentation strategy includes a region growing and split-merge method, characterized by decomposing the segmentation process into a number of steps in sequential order, wherein the subsequent steps should be determined by judging on the results of the previous steps. Other complicated image segmentation methods further include a classifier and cluster method, a random field based method and the like.

Figure 4:
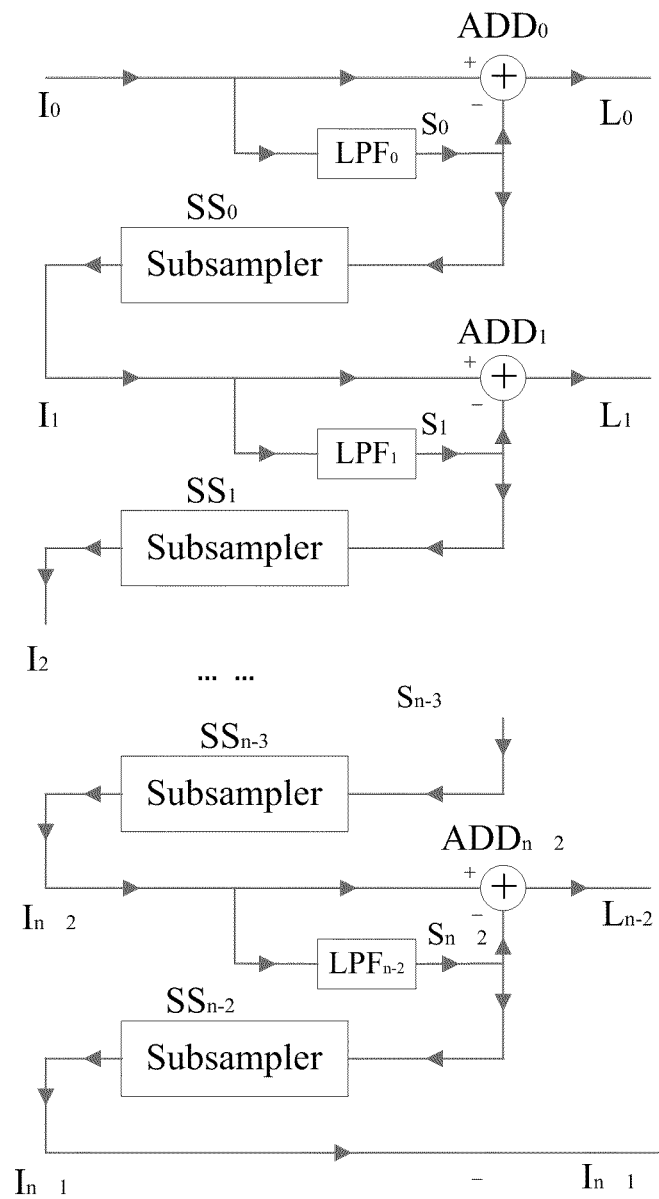
FIG. 4 is a schematic diagram of an image decomposition unit.

FIG. 4 is a schematic diagram of an image decomposition unit 220. The image decomposition unit 220 comprises low pass filters LPF0, LPF1, . . . LPFn-2 and LPFn-1, adders ADD0, ADD1, . . . ADDn-2 and ADDn-1, and subsamplers SS0, SS1, . . . SSn-3 and SSn-2. Low pass filters LPF0, LPF1, . . . LPFn-2 and LPFn-1 may be 3×3 or 5×5 smoothing filters, such as 3×3 or 5×5 Gaussian filter kernels, and subsamplers SS0, SS1, . . . SSn-3, SSn-2 may be ½ subsamplers.

The low pass filter LPF0 applies low pass filtering to the image I0 input into the image decomposition unit 220 so as to obtain the low-pass filtered image S0; the adder ADD0 subtracts the image S0 from the image I0, to obtain the minimum detail size of the detail image L0 including the noise. As the bandwidth of the image S0 low-pass filtered by the low pass filter LPF0 is reduced, the subsampler SS0 subsamples the image S0 low-pass filtered by the low pass filter LPF0, thereby obtaining the image I1 with a reduced size. The low pass filter LPF1 applies low pass filtering to the image I1 to obtain the low-pass filtered image S1, and the adder ADD1 subtracts the low-pass filtered image S1 from the image I1 to obtain the detail image L1 still including the noise and having a slightly larger detail size. S1 is subsampled to obtain the image I2 with a reduced size. In turn, . . . the image Sn-3 is subsampled by the subsampler SSn-3 to obtain the image In-2 with a further reduced size. The image In-2 is low-pass filtered by the low pass filter LPFn-2 to obtain the low-pass filtered image Sn-2, and the adder ADDn-2 subtracts the low-pass filtered image Sn-2 from the image In-2 to obtain the image Ln-2. The image Sn-2 is subsampled by the subsampler SSn-2 to obtain the image In-1 with a further reduced size. In this way, the image I0 is decomposed into the detail images L0, L1, . . . , Ln-2 in different levels of a hierarchy and the residual image In-1.

The image detail enhancement unit 240 applies the enhancement processing to each of the pixels in the detail images Li (i=0, 1, . . . , n-2) decomposed by the above-mentioned image decomposition unit 220. For example, each of the detail images Li can be transformed by utilizing a monotonic increasing odd symmetrical function, thereby obtaining the images Li' with enhanced details. The above-mentioned monotone increasing odd symmetrical function has a maximum gradient at a position where the variable is relatively small, but has increasingly smaller gradients at both sides increasingly farther from the position where the maximum gradient value exists.

When the image detail enhancement unit 240 applies the enhancement processing to the detail image Li, the noise in the detail image Li is amplified as well. According to one embodiment of the disclosure, the noise suppression unit 250 directly applies noise reduction processing to each of the detail images. In contrast, in conventional image processing methods, during noise suppression of images with enhanced details, the local variance information of a detail image is first acquired, and is then used to estimate the degree of noise suppression at the current position, thereby applying the noise suppression based on the degree of noise suppression. As the noise suppression unit 250 of the disclosure directly applies noise reduction processing to the detail images, the noise suppression process is thus simplified.

According to a one embodiment, a noise filter kernel is directly utilized by the noise suppression unit 250 to filter the detail images. The noise filter kernel can retain important detail edge information in the detail images while reducing the noise therein. The noise filter kernel may be a 3×3 noise filter kernel or a 5×5 noise filter kernel, or a noise filter kernel of any other size. With the disclosed noise filter, a pixel that is closer to a current pixel may have greater influence on filtering of the current pixel, and a pixel that has a value differing farther from that of the current pixel may have less influence on filtering of the current pixel. It is assumed that if L' represents a detail image before filtering, and L" represents a detail image after filtering, then L' [p,q] represents a pixel in the detail image L', and L" [p, q] represents a pixel in the detail image L". Thus, with the noise filter kernel, when the value of L' [p+j,q+k] is closer to that of L' [p, q], the influence of L'[p+j,q+k] on L' [p, q] is far greater than that of a pixel with value greatly different from the value of L'[p, q]. Therefore, when the noise filter kernel is used to filter the detail image L', the detail image L" can properly retain the important detail edge information in the detail image L' while effectively suppressing the noise in the detail image L' is effectively suppressed.

The following equation (1) is a filter function that may retain the detail edge information in the detail images while effectively reducing noise.

$$L''[p,q] = \frac{\sum_{j \neq 0, k \neq 0} L'[p+j, q+k] \cdot \exp\left(-\frac{r^2}{3_\sigma^2} - \frac{(L'[p+j,q+k] - L'[p,q])^2}{t^2}\right)}{\sum_{j \neq 0, k \neq 0} \exp\left(-\frac{r^2}{3_\sigma^2} - \frac{(L'[p+j,q+k] - L'[p,q])^2}{t^2}\right)} \quad \text{Equation (1)}$$

where, L' and L" are respectively images before and after filtering; r is the distance between pixel (p, q) and pixel (p+j, q+k) in the image L', and is, for example, 1, 2, 3, . . . , etc., p and q being integers greater than or equal to 0, j and k are integers not equal to 0, and the values of j and k depending on the size of the filter; for a filter with a size of (2x+1)×(2y+1), |j|≦x and |k|≦y, and k and y are positive integers; σ is a constant for controlling the degree of spatial smoothness, the value of which is a real number greater than 0; and t is a constant representing the gray scale threshold, the value of which is a positive integer which may be smaller than the maximum gray scale value. When the value of L'[p+j,q+k] is closer to that of L'[p, q], the influence of L'[p+j,q+k] on L'[p, q] is far greater than that of the pixel with value greatly different from that of L'[p, q]. Therefore, the image L" can retain the important detail edge information in the image L'.

Having viewed the application documents, those skilled in the art may further understand that other equations can also be used to achieve the filter function for retaining the important detail edge information in a detail image while effectively reducing the noise in the detail image. For example, the filter function that effectively reduces the noise in the detail image while retaining the important detail edge information in the detail image can be the following equation (1').

$$L''[p,q] = \frac{\sum_{j\neq 0, k\neq 0} \frac{L'[p+j, q+k]}{1 + \left(\frac{r^2}{3\sigma^2} + \frac{(L'[p+j,q+k] - L'[p,q])^2}{t^2}\right)^h}}{\sum_{j\neq 0, k\neq 0} \frac{1}{1 + \left(\frac{r^2}{3\sigma^2} + \frac{(L'[p+j,q+k] - L'[p,q])^2}{t^2}\right)^h}}$$

Equation (1')

where, L' and L" are respectively images before and after filtering; r is the distance between pixel (p, q) and pixel (p+j, q+k) in the image L', and is, for example, 1, 2, 3, ..., etc., p and q being integers greater than or equal to 0, j and k are integers not equal to 0, and the values of j and k depending on the size of the filter; for a filter with a size of (2x+1)×(2Y+1), |j|≦x and |k|≦y, and k and y are positive integers; σ is a constant for controlling the degree of spatial smoothness, the value of which is a real number greater than 0; t is a constant representing the gray scale threshold, the value of which is a positive integer which may be smaller than the maximum gray scale value; h is a positive integer. When the value of L'[p+j,q+k] is closer to that of L'[p, q], the influence of L'[p+j, q+k] on L'[p, q] is far greater than that of the pixel with value greatly different from that of L'[p,q]. Therefore, the image L" can retain the important detail edge information in the image L'.

Further, the degree of suppression of the noise may be controlled in the above-mentioned noise suppression unit 250. According to an embodiment of the disclosure, the value of a pixel in the residual image corresponding to the respective pixel in the detail images is used to control the degree of suppression of the noise, and the curve varying with the value of the pixel in the residual image and reflecting the degree of noise suppression may be predefined, which may be performed in various known ways.

The dynamic range compression unit 260 applies the dynamic compression processing to the detail images with enhanced details so as to narrow the range of variation thereof, such that the contrast of the reconstructed image is not reduced as much as possible when the reconstructed image is displayed.

Figure 5:
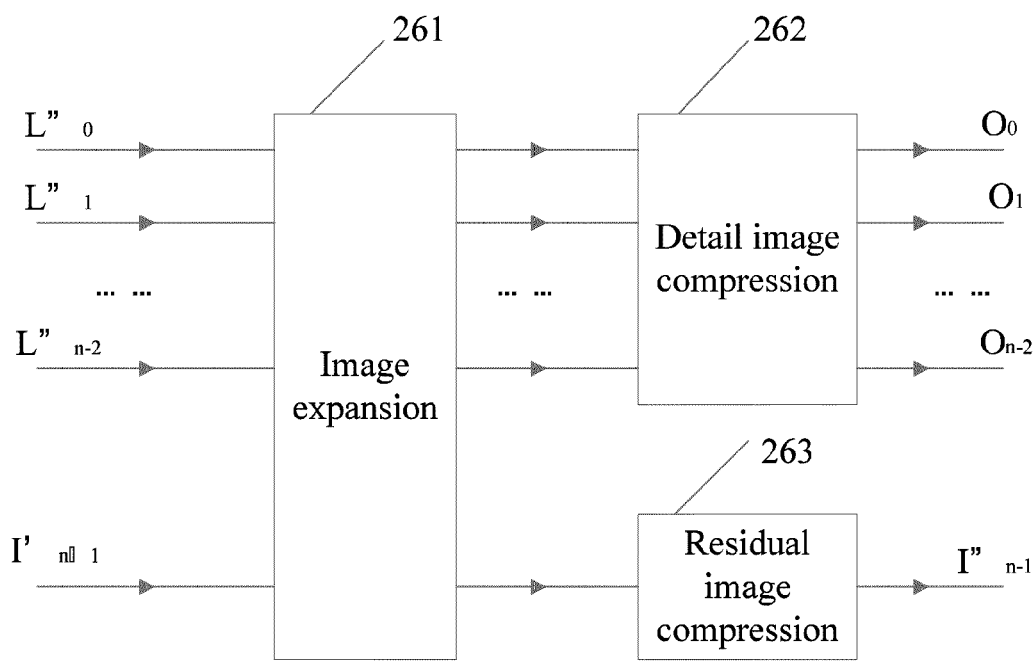
FIG. 5 is a schematic diagram of a dynamic range compression unit.

FIG. 5 is a schematic diagram of dynamic range compression unit 260. In one embodiment, the dynamic range compression unit 260 comprises an image expansion unit 261, a detail image compression unit 262, and a residual image compression unit 263. The image expansion unit 261 applies the size expansion to the detail images L"0, L"1, ..., L"n-2, In-1 that have been subjected to the enhancement processing by the image detail enhancement unit 240 and the noise reduction processing by the noise suppression unit 250, so as to obtain the images L'''0, L'''1, ..., L'''n-2, In-1 with the same size as that of the input image I0. The size expansion may be achieved by means of image interpolation, for example.

As the residual image In-1 only reflects the general trend of variation for the input image, i.e., the trend of the lightness variation for the input image, it substantially does not reflect detail information of the input image. In one embodiment, the weighted averaging is applied to the expanded residual image I'n-1 and a uniform image, thereby narrowing the range of variation thereof and obtaining the compressed residual image I"n-1, without changing the contrast of the details of the input image. The pixel value of the uniform image may be the mean value of pixels within the measurand area (or the region of interest) in the input image; the mean value of pixels within the measurand area (or the region of interest) is obtained by averaging the values of pixels within the measurand area (or the region of interest) segmented by the image segmentation unit 210. According to a further embodiment of the disclosure, the compressed residual image I"n-1 is derived from the following equation.

$$I''_{n-1}[p,q] = I'_{n-1}[p,q]*\alpha + B[p,q]*(1-\alpha)$$

Equation (2)

where I'$_{n-1}$[p,q] and I"$_{n-1}$[p,q] are respectively residual images before and after compressing; p and q being integers greater than or equal to 0; α is a weighting coefficient, the value of which may be a real number between 0 and 1; B[p,q] is a uniform image, wherein the value of each pixel is a constant, e.g., a mean value of the pixels within the region of interest in the input image, the region of interest being obtained by performing the image segmentation on the input image; and n is a positive integer representing the number of levels of the hierarchy of the input image decomposed by the image decomposition step.

As the contrast of the details of the detail image in larger size is relatively high, more reduction of the contrast of these detail images will not overtly affect observation of the details of the input image. According one embodiment, a higher compression ratio is applied to the compression of the contrast for the detail image with higher contrast. The detail image compression unit 262 compresses the size-expanded images L'''$_0$, L'''$_1$, L'''$_{n-2}$, so as to obtain the compressed detail images O$_0$, O$_1$, ..., and O$_{n-2}$.

In one configuration, the compression of the size-expanded images L'''$_0$, L'''$_1$, ..., L'''$_{n-2}$ is derived from the following equation (3).

$$O_i[p,q] = L'''_i[p,q]*\beta_i$$

Equation (3)

where, L'''$_i$[p,q] is a detail image before compressing; O$_i$[p, q] is a detail image after compressing, p and q are integers greater than or equal to 0; and the value of β$_i$ is specified as follows:

$$\beta_i = \begin{cases} 1, & i \leq \tau \\ 1 - \frac{1-\alpha}{n-1-\tau}(i-\tau), & i > \tau \end{cases}$$

where n is a positive integer representing the number of levels of the hierarchy of the input image decomposed by the image decomposition unit; i refers to the level number of the hierarchy in which a compressed detail image is located; τ is a constant, the value of which is an integer between 0 and n; and α is a weighting coefficient, the value of which may be a real number between 0 and 1.

Figure 6:
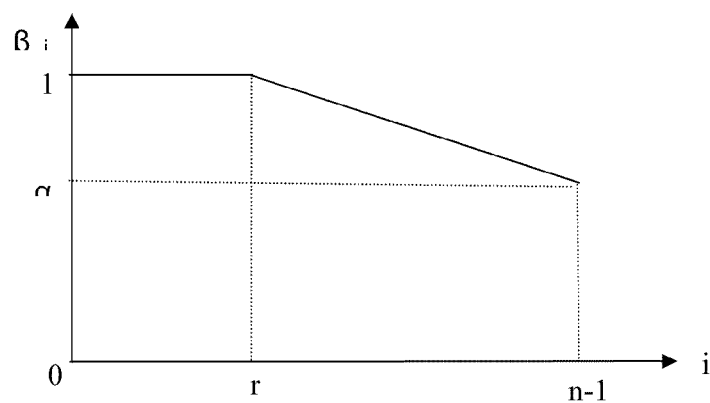
FIG. 6 is a continuous curve graph of a coefficient $\beta i$ which is multiplied by a detail image and varies with the level number i of the hierarchy in which the detail image is located during a dynamic range compression.

FIG. 6 is a continuous curve graph of a coefficient βi which is multiplied by the detail image and varies with the level number i of the hierarchy in which a detail image is located during a dynamic range compression.

Each of the compressed detail images O$_0$, O$_1$, ..., O$_{n-2}$ and the compressed residual image I"$_{n-1}$ are recomposed by the image reconstruction unit 270, so as to obtain the reconstructed image OUT[p,q]. The equation (5) is provided for reconstructing an image by the image reconstruction unit 270.

$$OUT[p, q] = I''_{n-1}[p, q] + \sum_i O_i[p, q] \qquad \text{Equation (5)}$$

where the value of i is between 0 and (n−2), n being a positive integer representing the number of levels of the hierarchy of the input image decomposed by the image decomposition unit.

The image enhancement processing provides a better improvement for the local effect of an image. To achieve better global effects, the tone scale unit 300 applies the optimal conversion to the reconstructed image OUT[p,q]. In one embodiment, this optimal curve may be an S-shaped curve. The optimization processing may be applied to the reconstructed image by means of various known tone scale algorithms.

Figure 7:
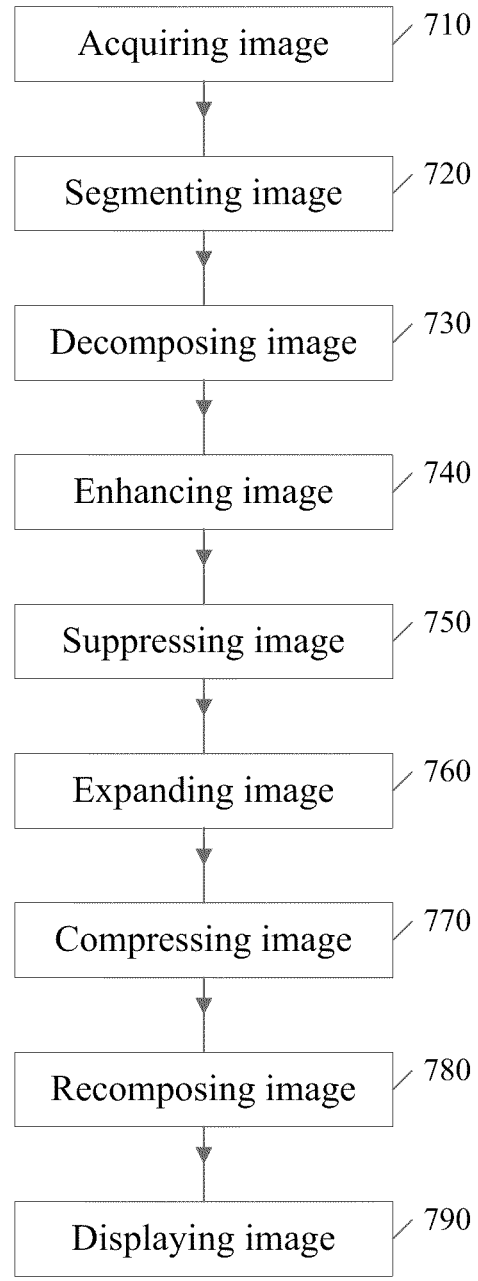
FIG. 7 is a flowchart of a method for image processing.

FIG. 7 is a flowchart of method for processing an image according to the embodiments of the disclosure. At step 710, an input image is acquired, which may be achieved by various image acquisition methods, e.g., the image acquisition methods described in connection with FIG. 2.

At step 720, the input image is segmented to obtain the measurand area (or the region of interest) and the background area. The input image may be segmented by various methods, for example, by means of a thresholding method, by means of a region growing and split-merge method, a classifier and cluster method, a random field based method, and the like.

At step 730, the segmented image is decomposed. For example, the segmented image is decomposed into the detail images in different levels of a hierarchy and the residual image in a manner described in connection with FIG. 4, wherein the detail images in the different levels of the hierarchy and the residual image differ from each other in size, the size of the residual image being the smallest, and the size of the detail image with the largest size being the same as that of the input image.

At step 740, enhancement processing is applied to the decomposed detail images in the different levels of the hierarchy. For example, each of the detail images may be transformed by utilizing a monotonic increasing odd symmetrical function, so as to obtain the image with enhanced details. The above-mentioned monotonic increasing odd symmetrical function has the maximum gradient at the position where the variable is relatively small, but has increasingly smaller gradients at both sides increasingly farther from the position where the maximum gradient value exists.

At step 750, noise suppression is applied to each of the detail images that have been subjected to the enhancement processing. For example, the detail images are filtered by directly using a noise filter kernel which can retain important detail edge information in the detail images while reducing the noise thereof. The noise filter kernel according to the disclosure may be a 3×3 noise filter kernel or a 5×5 noise filter kernel, or a noise filter kernel of any other size.

At step 760, the size expansion is applied to each of the detail images with reduced sizes and the residual image, such that the expanded size is the same as that of the input image. The size expansion applied to each of the detail images with reduced sizes and the residual image may be implemented by means of interpolation.

At step 770, each of the detail images and the residual image that have been subjected to size expansion are compressed, wherein a higher compression ratio is applied to the compression of the contrast for the detail image with higher contrast, for example, the residual image and each of the detail images may be respectively compressed according to equation (2) and equation (3).

At step 780, each of the detail images and the residual image that have been compressed are recomposed, for example, according to equation (5), in order to obtain the recomposed image.

At step 790, the recomposed image is displayed.

Figure 8:
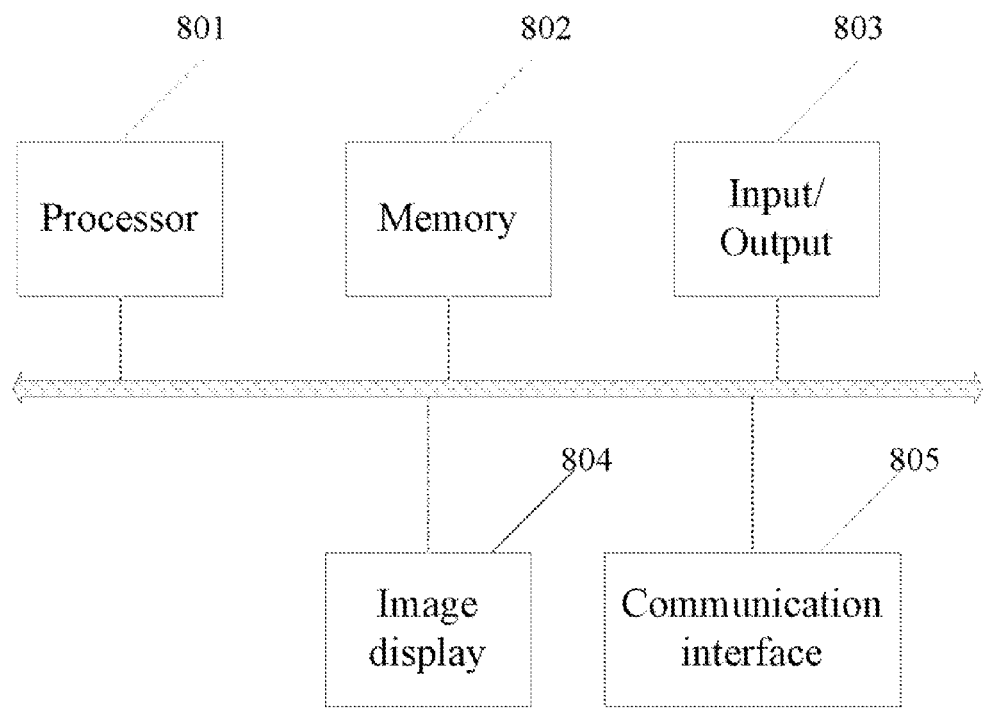
FIG. 8 is a schematic diagram of a computer system capable of implementing the embodiments of the disclosure.

FIG. 8 shows a computer system that may implement the embodiments of the disclosure. The computer system may include a processor 801, a memory 802, input/output ports 803, an image display 804, and a communication interface 805. The methods of the disclosure may be implemented as a computer program, which may be stored in the memory 802 or in other computer-readable media accessible by the computer, or in other computer systems. The computer program stored in other media accessible by the computer may be accessed via the input/output ports 803, and the computer program stored in other computer systems may be accessed via the communication interface 805. The computer program, when executed in the computer system 800, causes the computer system 800 to carry out the image processing methods of the disclosure. In alternative embodiments, the method and apparatus of the disclosure may be implemented via hardware or any suitable combination of hardware and software.

The disclosed embodiments may be broadly applied in medical imaging apparatuses, digital camera products, industrial and scientific instruments, and the like. For example, the application of the disclosed embodiments in medical imaging has been demonstrated by clinical trials and has achieved good effects.

The foregoing description of the embodiments of the disclosure in combination with the figures aims to provide a thorough understanding of the disclosure. It should be noted that since the specification is meant to be illustrative rather than limiting, those skilled in the art, having reviewed the specification, may make various modifications, variations, substitutions or the like to the embodiments of the disclosure, without departing from the spirit of the disclosure. For example, in the above embodiments, the noise reduction process of the detail images may be performed in other filtering functions for retaining the detail edge information, and the curve that reflects the trend of variation of the coefficient and is multiplied by the detail images during the dynamic range compression may be other curves. It is intended that the scope of the disclosure is defined by the appended claims.

What is claimed is:

1. An apparatus for processing an input image, comprising:
an image decomposition unit for decomposing the input image into a residual image and a set of detail images in different levels of a hierarchy, wherein at least one detail image differs from the input image and comprises detail information from a high frequency band;
an image enhancement unit for enhancing the set of detail images;
a noise suppression unit for reducing noise of the enhanced set of detail images without applying noise estimation to a local area of the enhanced set of detail images in advance,
wherein the noise suppression unit directly applies noise reduction processing to each of the enhanced detail images;
an image reconstruction unit for recomposing the residual image and the set of detail images with reduced noise so as to obtain a resultant image; and a dynamic range compression unit for applying dynamic range compression to the enhanced set of detail images and the residual image;

wherein the dynamic range compression unit compresses the residual image by weighted averaging the residual image and a uniform image.

2. The apparatus according to claim 1, wherein the noise suppression is a noise filter for retaining detail edge information for the enhanced set of detail images while reducing the noise of the enhanced set of detail images.

3. The apparatus according to claim 2, wherein, with the noise filter, a pixel that is closer to a current pixel has greater influence on filtering of the current pixel, and a pixel that has a value differing farther from that of the current pixel has less influence on filtering of the current pixel.

4. The apparatus according to claim 3, wherein the noise filter uses the following equation to reduce the noise of the enhanced set of detail images:

$$L''[p,q] = \frac{\sum_{j\neq 0, k\neq 0} L'[p+j, q+k] \cdot \exp\left(-\frac{r^2}{3\sigma^2} - \frac{(L'[p+j, q+k] - L'[p,q])^2}{t^2}\right)}{\sum_{j\neq 0, k\neq 0} \exp\left(-\frac{r^2}{3\sigma^2} - \frac{(L'[p+j, q+k] - L'[p,q])^2}{t^2}\right)}$$

where, L' and L" are respectively images before and after filtering; r is the distance between pixel (p, q) and pixel (p+j, q+k) in the image L', p and q are integers greater than or equal to 0, j and k are integers not equal to 0, and the values of j and k depending on the size of the noise filter; for the noise filter with a size of (2x+1)×(2y+1), |j|≦x and |k|≦y, and x and y are positive integers; σ is a constant for controlling the degree of spatial smoothness, the value of which is a real number greater than 0; and t is a constant representing a gray scale threshold which is a positive integer not greater than the maximum gray scale value in the image L'.

5. The apparatus according to claim 1, wherein the dynamic range compression unit performs the weighted averaging on the residual image and a uniform image according to the following equation:

$$I''_{n-1}[p,q] = I'_{n-1}[p,q]*\alpha + B[p,q]*(1-\alpha)$$

where $I'_{n-1}[p,q]$ and $I''_{n-1}[p,q]$ are respectively the residual images before and after compressing; p and q being integers greater than or equal to 0; α is a weighting coefficient comprising a real number between 0 and 1; B[p,q] is a uniform image, wherein the value of each pixel is a constant, the constant calculated based on a mean value of pixels within a region of interest in the input image; the region of interest obtained by performing image segmentation on the input image; and n is a positive integer representing the number of levels of a hierarchy of the input image decomposed by the image decomposition unit.

6. The apparatus according to claim 1, wherein the dynamic range compression unit further applies a higher compression ratio to compression of contrast for a detail image with higher contrast.

7. The apparatus according to claim 6, wherein the dynamic range compression unit compresses the detail images according to the following equation:

$$O_i[p,q] = L''_i[p,q]*\beta_i$$

where, $L''_i[p,q]$ is the detail image before compressing; $O_i[p,q]$ is the detail image after compressing; p and q being integers greater than or equal to 0, the value of $\beta_i$ is specified as follows:

$$\beta_i = \begin{cases} 1, & i \leq \tau \\ 1 - \frac{1-\alpha}{n-1-\tau}(i-\tau), & i > \tau \end{cases}$$

n is a positive integer representing the number of levels of a hierarchy of the input image decomposed by the image decomposition unit; i refers to the level number of the hierarchy in which a compressed detail image is located; τ is a constant, the value of which is an integer between 0 and n; and α is a weighting coefficient comprising a real number between 0 and 1.

8. A method for processing an input image, comprising:

decomposing the input image into a residual image and a set of detail images in different levels of a hierarchy, wherein at least one detail image differs from the input image and comprises detail information from a high frequency band;

enhancing the set of detail images;

reducing noise of the enhanced set of detail images without applying noise estimation to a local area of the enhanced set of detail images in advance, wherein reducing noise comprises directly applying noise reduction processing to each of the enhanced detail images;

recomposing the residual image and the set of detail images with reduced noise so as to obtain a resultant image; and applying dynamic range compression to the enhanced set of detail images and the residual image;

wherein the dynamic range compression step compresses the residual image by weighted averaging the residual image and a uniform image.

9. The method according to claim 8, wherein in the noise reduction step, detail edge information for the enhanced set of detail images is able to be retained while the noise of the enhanced set of detail images is reduced.

10. The method according to claim 9, wherein in the noise reduction step, a pixel that is closer to a current pixel has greater influence on filtering of the current pixel, and a pixel that has a value differing farther from that of the current pixel has less influence on filtering of the current pixel.

11. The method according to claim 10, wherein, in the noise reduction step, the following equation is used to reduce the noise of the enhanced set of detail images:

$$L''[p,q] = \frac{\sum_{j\neq 0, k\neq 0} L'[p+j, q+k] \cdot \exp\left(-\frac{r^2}{3\sigma^2} - \frac{(L'[p+j, q+k] - L'[p,q])^2}{t^2}\right)}{\sum_{j\neq 0, k\neq 0} \exp\left(-\frac{r^2}{3\sigma^2} - \frac{(L'[p+j, q+k] - L'[p,q])^2}{t^2}\right)}$$

where, L' and L" are respectively images before and after filtering; r is the distance between pixel (p, q) and pixel (p+j, q+k) in the image L', p and q being integers greater than or equal to 0, j and k being integers not equal to 0, and the values of j and k depending on the size of a filter for the noise filtering step; for the filter with a size of $(2x+1) \times (2y+1)$, $|j| \leq x$ and $|k| \leq y$, and x and y are positive integers;

a is a constant for controlling the degree of spatial smoothness, the value of which is a real number greater than 0; and t is a constant representing a gray scale threshold which is a positive integer not greater than the maximum gray scale value in the image L'.

12. The method according to claim 8, wherein the dynamic range compression step performs the weighted averaging on the residual image and a uniform image according to the following equation:

$$I''_{n-1}[p,q] = I'_{n-1}[p,q]*\alpha + B[p,q]*(1-\alpha)$$

where $I'_{n-1}[p,q]$ and $I''_{n-1}[p,q]$ are respectively the residual images before and after compressing; p and q being integers greater than or equal to 0; $\alpha$ is a weighting coefficient comprising a real number between 0 and 1; $B[p,q]$ is a uniform image, wherein the value of each pixel is a constant, the constant calculated based on a mean value of pixels within a region of interest in the input image, the region of interest obtained by performing image segmentation on the input image; and n is a positive integer representing the number of levels of a hierarchy of the input image decomposed by the image decomposition step.

13. The method according to claim 8, further comprising applying a higher compression ratio to compression of contrast for a detail image with higher contrast.

14. The method according to claim 13, wherein the detail image is compressed according to the following equation:

$$O_i[p,q] = L''_i[p,q]*\beta_i$$

where, $L''_i[p,q]$ is the detail image before compressing; $O_i[p,q]$ is the detail image after compressing, p and q being integers greater than or equal to 0; and the value of $\beta_i$ is specified as follows:

$$\beta_i = \begin{cases} 1, & i \leq \tau \\ 1 - \dfrac{1-\alpha}{n-1-\tau}(i-\tau), & i > \tau \end{cases}$$

n is a positive integer representing the number of levels of a hierarchy of the input image decomposed in the image decomposition step; i refers to the level number of the hierarchy in which a compressed detail image is located; $\tau$ is a constant, the value of which is an integer between 0 and n; and $\alpha$ is a weighting coefficient comprising a real number between 0 and 1.

15. An apparatus for processing an input image, comprising:

means for decomposing the input image into a residual image and a set of detail images in different levels of a hierarchy, wherein at least one detail image differs from the input image and comprises detail information from a high frequency band;

means for enhancing the set of detail images;

means for reducing noise of the enhanced set of detail images without applying noise estimation to a local area of the enhanced set of detail images in advance, wherein the means for reducing noise directly applies noise reduction processing to each of the enhanced detail images;

means for recomposing the residual image and the set of detail images with reduced noise so as to obtain a resultant image; and means for applying dynamic range compression to the enhanced set of detail images and the residual image;

wherein the means for applying dynamic range compression compresses the residual image by weighted averaging the residual image and a uniform image.

16. A non-transitory computer-readable storage medium comprising program code for causing a computer to perform a method for processing an input image, the method comprising:

decomposing the input image into a residual image and a set of detail images in different levels of a hierarchy, wherein at least one detail image differs from the input image and comprises detail information from a high frequency band;

enhancing the set of detail images;

reducing noise of the enhanced set of detail images without applying noise estimation to a local area of the enhanced set of detail images in advance, wherein reducing noise comprises directly applying noise reduction processing to each of the enhanced detail images; and recomposing the residual image and the set of detail images with reduced noise so as to obtain a resultant image; and applying dynamic range compression to the enhanced set of detail images and the residual image;

wherein the dynamic range compression step compresses the residual image by weighted averaging the residual image and a uniform image.

17. An apparatus for processing an input image, comprising:

an image decomposition unit for decomposing the input image into a residual image and a set of detail images in different levels of a hierarchy, wherein at least one detail image differs from the input image and comprises detail information from a high frequency band;

an image enhancement unit for enhancing the set of detail images;

a noise suppression unit for reducing noise of the enhanced set of detail images without applying noise estimation to a local area of the enhanced set of detail images in advance, wherein the noise suppression unit directly applies noise reduction processing to each of the enhanced detail images; and an image reconstruction unit for recomposing the residual image and the set of detail images with reduced noise so as to obtain a resultant image;

wherein the noise suppression is a noise filter for retaining detail edge information for the enhanced set of detail images while reducing the noise of the enhanced set of detail images;

wherein, with the noise filter, a pixel that is closer to a current pixel has greater influence on filtering of the current pixel, and a pixel that has a value differing farther from that of the current pixel has less influence on filtering of the current pixel;

wherein the noise filter uses the following equation to reduce the noise of the enhanced set of detail images:

$$L''[p,q] = \frac{\sum_{j\neq 0, k\neq 0} L'[p+j, q+k] \cdot \exp\left(-\frac{r^2}{3\sigma^2} - \frac{(L'[p+j,q+k] - L'[p,q])^2}{t^2}\right)}{\sum_{j\neq 0, k\neq 0} \exp\left(-\frac{r^2}{3\sigma^2} - \frac{(L'[p+j,q+k] - L'[p,q])^2}{t^2}\right)}$$

where, L' and L" are respectively images before and after filtering; r is the distance between pixel (p, q) and pixel (p+j, q+k) in the image L', p and q are integers greater than or equal to 0, j and k are integers not equal to 0, and the values of j and k depending on the size of the noise filter; for the noise filter with a size of (2x+1)×(2y+1), $|j| \leq x$ and $|k| \leq y$, and x and y are positive integers; σ is a constant for controlling the degree of spatial smoothness, the value of which is a real number greater than 0; and t is a constant representing a gray scale threshold which is a positive integer not greater than the maximum gray scale value in the image L'.

* * * * *